United States Patent [19]

Ogawa et al.

[11] Patent Number: 5,266,397
[45] Date of Patent: Nov. 30, 1993

[54] AMORPHOUS SILICA-TYPE FILLER

[75] Inventors: Masahide Ogawa; Kiyoshi Abe, both of Shibata; Masao Takahashi, Niigata; Yuuzi Washio, Niigata; Kazumitsu Enomoto, Niigata; Toshio Kitsu, Shibata, all of Japan

[73] Assignee: Mizusawa Industrial Chemicals, Ltd., Tokyo, Japan

[21] Appl. No.: 851,910

[22] Filed: Mar. 16, 1992

[30] Foreign Application Priority Data

Mar. 15, 1991 [JP] Japan .................................. 3-74421
Mar. 15, 1991 [JP] Japan .................................. 3-74422

[51] Int. Cl.$^5$ .............................................. B32B 9/00
[52] U.S. Cl. .................................... 428/323; 524/313; 430/162; 428/324
[58] Field of Search ......................... 524/313; 430/162; 428/323, 324

[56] References Cited

U.S. PATENT DOCUMENTS 4,382,115  5/1983  Takahashi ......................... 428/424.6
4,885,225  12/1989  Heller et al. ......................... 430/162
5,137,955  8/1992  Tsuchiya et al. ..................... 524/313

FOREIGN PATENT DOCUMENTS 2741264  3/1978  Fed. Rep. of Germany .

OTHER PUBLICATIONS

H. F. Mark et al, 'Kirk-Othmer Encyclopedia of Chemical Technology, 3rd Edn. vol. 20' 1978, Wiley & Sons, New York.
World Patents Index Latest Week 9005, Derwent Publ. Ltd, London GB; AN 84-066295/11 & JP-B-2 001 030 (Mizusawa KK) Jan. 10, 1990.
World Patents Index Latest Week 8849, Derwent Publ. Ltd, London GB; AN 83-38088K/16 & JP-B-63 058 170 (Sumimoto Chemical KK).

Primary Examiner—Patrick J. Ryan
Assistant Examiner—Cathy K. Lee
Attorney, Agent, or Firm—Sherman and Shalloway

[57] ABSTRACT

The amorphous silica has a large apparent specific gravity despite of its BET specific surface area of 20 to 500 m$^2$/g, has an oil absorption amount of as small as 50 to 120 ml/100 g, has an agglomeration degree (D1/D0=DA) defined by the ratio of silica elementary particle diameter D0 to primary particle diameter D1 of from 10 to 50, and has nearly a spherical particulate structure which is quite different from that of the conventional gelation method silica (DA=$\infty$). The amorphous silica-type filler exhibits excellent properties in regard to handling, processability, dispersion property and abrasion-resistant property and, when added as, for example, an anti-blocking agent, makes it possible to obtain resin films having transparency and scratch-resistant property without fisheyes or voids. Owing to the above properties, the amorphous silica that is used as a filler for the heat-sensitive recording papers suppresses ground fogging, improves the image concentration, makes it possible to apply a highly viscous coating solution since the filler dispersed in an aqueous solution creates very small viscosity, and imparts excellent abrasion resistance to the apparatus during the step of coating.

13 Claims, 4 Drawing Sheets

AMORPHOUS SILICA-TYPE FILLER

BACKGROUND OF THE INVENTION

1 Field of the Invention

The present invention relates to an amorphous silica filler, and more specifically to an amorphous silica filler which exhibits excellent handling property and processability and which, when added to a resin film, exhibits excellent dispersing property, transparency and anti-blocking property, and which makes it possible to obtain a resin film having excellent scratch-resistant property that does not get scratched on the surfaces even when the films are rubbed by each other.

The present invention further relates to a filler for heat-sensitive recording papers, and more specifically to an amorphous silica filler for heat-sensitive recording papers that can be excellently applied onto the heat-sensitive recording papers, that makes it possible to form a vivid heat-sensitive image without fogging on the ground, and that does not permit scum to adhere on the thermal head.

2. Description of the Prior Art

The amorphous silica fillers include the so-called dry-method silica and the wet-method silica, and are used for paints, information-recording papers, rubbers, resin molded products and like applications depending upon their properties.

The amorphous silica exhibits properties that vary greatly depending upon the manufacturing method. In particular, the latter wet-method amorphous silica exhibits widely varying properties if conditions such as concentration, temperature, pressure, time and reaction method are changed in neutralizing an alkali silicate with an acid.

For instance, there have been known a silica hydrogel (Japanese Patent Publication No. 13834/1973, Japanese Patent Laid-Open No. 16049/1988) obtained by gelatinizing (spraying into a gaseous medium) within a short period of time a silica sol formed by neutralizing an alkali silicate with an acid, and a hydrated silica gel (Japanese Patent Publication No. 1764/1990) having a water content of 20 to 50% by weight obtained by washing with an acid a silica hydrogel hardened with an acid to obtain a silica hydrogel having pH of 2.5 to 5, followed by drying and pulverizing.

In addition to the above amorphous silica, furthermore, there have heretofore been widely used inorganic fine particles as an anti-blocking agent for resin films. For instance, there have been proposed a method (Japanese Patent Publication No. 41099/1974) of improving transparency and anti-blocking property by adding fine powdery silica whose silanol groups on the surfaces thereof have been substituted by oleophilic groups to a resin, a method (Japanese Patent Publication No. 16134/1977) of improving anti-blocking property by adding zeolite particles to biaxially undrawn polypropylene film, and a drawn polypropylene film (Japanese Patent Publication No. 58170/1988) having improved transparency, slipping property and anti-blocking property obtained by adding fine powdery silica having an apparent specific gravity of 0.1 to 0.2 g/cm$^3$ and a specific surface area of smaller than 150 m$^2$/g.

Furthermore, a heat-sensitive recording paper has heretofore been used in facsimiles, printers, data communications, computer terminals, measuring instruments and copying machines which use a thermal head, a heat pen, an infrared-ray lamp or a laser as a source of heat, the heat-sensitive recording paper being provided with a recording layer that comprises a color agent such as a leuco-pigment and a color coupler such as phenols that develop a color upon hot-contact with the color agent, which are contained in a binder.

In making a record on the heat-sensitive recording paper by the heat by bringing a recording head into contact with the recording layer, the components in the recording layer melt and stick resulting in the adhesion of scum onto the recording head and the development of sticking. In order to prevent these problems, various fillers are contained in the recording layer. When the amorphous silica is contained in the recording layer as a filler for the heat-sensitive recording paper, however, the reaction is promoted between the leuco-pigment and the phenols due to the surface activity of silica giving rise to the development of ground color (ground fogging).

In order to prevent the above problem, the present inventors have proposed in Japanese Patent Publication No. 1030/1990 a filler for heat-sensitive recording papers comprising fine particulate amorphous silica having a particle size distribution of secondary particle sizes in which particles of a size of smaller than 4 $\mu$m as measured by the centrifugal sedimentation method are contained in amounts of more than 90% by weight of the total weight, having a BET specific surface area of 10 to 100 m$^2$/g, and having a bulk density of 0.14 to 0.30 g/ml.

SUMMARY OF THE INVENTION

The object of the present invention is to provide an amorphous silica filler which exhibits excellent handling property, processability, and dispersion property, and which causes less damage to the apparatus that results from abrasion. The invention further provides an amorphous anti-blocking agent for resin films that imparts excellent anti-blocking property (AB property) to the resin film, that exhibits excellent dispersion property and transparency, and that imparts excellent scratch-resistant property to the film surfaces so that they will not get scratched when the films are rubbed by each other, and provides a thermoplastic resin film using the above anti-blocking agent.

Amorphous silica has heretofore been widely used as an anti-blocking agent for resin films because of the reason that the resin films blended with amorphous silica exhibits excellent anti-blocking property and transparency leaving, however, room for improvement such as insufficient dispersion property and film defects such as fisheyes and voids. It has therefore been desired to remove these defects and to further improve anti-blocking property and transparency.

The reason why the film blended with amorphous silica exhibits improved anti-blocking property is attributed to that the amorphous silica particles distributed on or near the surface of the film form a gap between the film surfaces. When the films are rubbed by each other, however, there arises a big problem in that the film surfaces get scratched by the grinding action of amorphous silica. In particular, the higher the anti-blocking property of the amorphous silica, the more the surface of the film tends to be get scratched by abrasion.

Moreover, the conventional amorphous silica used for the above-mentioned applications is in a fine powdery form having a small apparent specific gravity and large bulkiness, and lacks handling property because it is so powdery. Besides, the amorphous silica is so bulky that it lacks processability and dispersion property when it is blended together with the resin.

The present inventors have found through the study such experimental rules between the specific surface area of amorphous silica and the surface hardness that Mohs' hardness decreases with a decrease in the specific surface area and that Mohs' hardness increase with an increase in the specific surface area. Moreover, the amorphous silica having a large specific area includes particles having appearance of the shape of broken glass pieces and sharp edges. This is attributed to that in the amorphous silica having a large specific surface area, the particle size (which in this specification is referred to as elementary particle size) becomes very fine when the soluble silicic acid component is liberated in the form of silicic acid, and the elementary particles firmly coagulate together to form gel-like particles.

Depending upon the AB property and the transparency of the film, however, it often becomes necessary to use amorphous silica having a relatively large specific surface area for the resin film, resulting in the development of troubles such as damage to the apparatus by abrasion during the production of resin films, and development of scratches on the film surfaces as the product films are rubbed by each other, deteriorating the commercial value of the products. Therefore, no satisfactory amorphous silica has yet been obtained that can be used as an anti-blocking agent for the resin films.

Another object of the present invention is to provide a filler for heat-sensitive recording papers that does not develop ground fogging, that exhibits excellent scum-adhesion preventing property, and that is capable of forming image of a high concentration.

A further object of the present invention is to provide a filler for heat-sensitive recording papers that is capable of forming a dispersion of a high concentration at the time of coating operation, and that helps facilitate the coating operation and decrease the manufacturing cost.

That is, the fine particulate amorphous silica proposed in Japanese Patent Publication No. 1030/1990 is a very excellent one for solving the problems of the heat-sensitive recording papers, but has a fine particle size and causes the viscosity of the coating solution thereof to become very great. When the amorphous silica is used as a coating filler, therefore, the coating operation must be carried out by selecting the filler concentration of the coating solution to be lower than that of when calcium carbonate or baked kaolin is used. Moreover, an extended period of time is required for drying giving problems from the viewpoint of coating operation and cost of producing recording papers.

According to the present invention, there are provided an amorphous silica filler having an average primary particle diameter (D1) of 100 to 270 nm as observed by a scanning-type electron microscope, an apparent specific gravity (JIS K 6220.6.8 method) of 0.24 to 0.55 g/cm$^3$, a BET specific surface area of 200 to 500 m$^2$/g, a silica elementary particle diameter (D0) of 5 to 15 nm as calculated from the BET specific surface area, and an agglomeration degree (DA) defined by the ratio (average primary particle diameter (D1))÷(silica elementary particle diameter (D0) of from 10 to 50, as well as a filler for heat-sensitive recording papers.

According to the present invention, furthermore, there is provided a thermoplastic resin film obtained by blending the amorphous silica as an anti-blocking agent in an amount of 0.01 to 5 parts by weight per 100 parts by weight of the thermoplastic resin.

According to the present invention, there is further provided a heat-sensitive recording paper obtained by adding the amorphous silica as a filler in an amount reckoned as a solid component of 5 to 60% by weight into a heat-sensitive recording layer composition of a heat-sensitive recording paper that is known per se. Various particle sizes of the amorphous silica will be referred to in this specification, and the method of measurement and meanings are as described below.

If the BET specific surface area (m$^2$/g) is denoted by SA and the elementary particle size (nm) by D0, then the silica elementary particle diameter (D0) is calculated from a relation $SA = 2727 \div D0$. The specific surface area of the amorphous silica particles varies depending upon a minimum basic particle diameter of when the amorphous silica particles are precipitated as free silicic acid, i.e., varies depending upon the elementary particle diameter. The amorphous silica elementary particles are essentially of a spherical shape, and do not exist alone, and their presence cannot be confirmed by an ordinary electron microscope. Average primary particle diameter (D1): The individual particle diameters are measured from a scanning-type electron microphotography of amorphous silica, and a number average value thereof is found. A minimum particle diameter of amorphous silica that consists of agglomerated or coagulated elementary particles and that can be detected through an electron microscope.

Secondary particle diameter (D2): A median diameter based on the volume by measuring amorphous silica by the Couter Counter method. A particle diameter with which the amorphous silica consisting of the coagulation of the primary particles is allowed to behave as powdery particles.

According to the present invention, the amorphous silica has an average primary particle diameter (D1) of from 100 to 270 nm yet has a BET specific surface area of 200 to 500 m$^2$/g, and further has an agglomeration degree (DA) defined by D1/D0 of from 10 to 50, making a distinguished feature.

FIG. 1 is a scanning-type electron microphotography showing the particle structure of amorphous silica used in the present invention, from which it will be understood that the amorphous silica used in the present invention has an average primary particle diameter of 100 to 270 nm, a clear particle shape (appearance), and a uniform particle structure. It will further be recognized that the primary particles are distributed symmetrically.

The amorphous silica of the present invention has a particle structure which is radically different from the conventional amorphous silica that has silica elementary particles finer than those of the present invention, that is not observed as so-called monotonous particles by an ordinary electron microscope but is observed as discrete particles having ambiguous agglomeration degree (see FIG. 2), or that is observed in the form of a continuous and homogeneous gel (see FIG. 3).

According to the present invention, the BET specific surface area is specific to range from 200 to 500 m$^2$/g because when the specific surface area becomes smaller than 200 m$^2$/g, the anti-blocking property is lost and the film defects develop such as fisheyes and voids and when the specific surface area becomes greater than 500 m$^2$/g, the haze of the film increases, the gloss decreases, transparency is lost, the film gets scratched by abrasion in increased amounts, and it becomes difficult to set the average primary particle diameter to lie within a range of the present invention no matter how the powder is after-treated.

Amorphous silica having the BET specific surface area of from 200 to 500 m²/g has been widely known. According to the present invention, however, particularly important feature resides in that the agglomeration degree (DA) of silica elementary particles lies from 10 to 50, and the average primary particle diameter (D1) lies from 100 to 270 nm.

According to the present invention in which the agglomeration degree (DA) and the average primary particle diameter (D1) are maintained to lie over the above-mentioned ranges, the film exhibits excellent anti-blocking property as well as excellent resistance against scratches by abrasion when the films are rubbed by each other. These facts will become readily obvious from the examples and comparative examples described later.

By setting the agglomeration degree (DA) and the average primary particle diameter (D1) to lie within the above-mentioned ranges, furthermore, it is allowed to form a vivid heat-sensitive image maintaining a high level without ground fogging on the heat-sensitive recording paper, and to greatly improve resistance against abrasion of the apparatus during the step of coating. This fact can be readily understood from FIG. 1 which shows the particle structure of amorphous silica of the present invention and from FIG. 3 which shows the particle structure of conventional amorphous silica in which the particles have vitreous appearance.

Because of such a novel particle structure, the amorphous silica used in the present invention does not form vitreous gel: large silica particles of a primary particle diameter that serve as nuclei are agglomerated by very fine silica particles that serve as a binder, and whereby relatively large apparent specific gravity and BET method specific surface area are exhibited, and the oil absorption amount is as small as 50 to 120 ml/100 g.

Therefore, the amorphous silica of the present invention has a particle structure consisting of large primary particles despite of its large BET specific surface area. When dispersed in, for example, water, therefore, the dispersion exhibits a very small viscosity.

Referring to FIG. 4 showing a relationship between the dispersion concentration of filler in water and the viscosity, the conventional amorphous silica filler (specific surface area 60 m²/g, apparent specific gravity 0.18 g/cm³) exhibits viscosity that abruptly increase near the dispersion concentration in water of about 30% by weight, i.e., exhibits very increased viscosity, whereas the filler of the present invention exhibits viscosity that rises very mildly with respect to the dispersion concentration in water. Therefore, the filler of the present invention can be provided in the form of a dispersion solution of a low viscosity yet having a high concentration, and contributes to enhancing the coating operation efficiency and decreasing the energy cost for evaporating water.

The amorphous silica of the present invention has the particle structure as described above in which the secondary particle diameter is as small as 1 to 5 μm and, preferably, 1 to 2.5 μm, and is very dense and exhibits very excellent dispersing property. Therefore, the amorphous silica of the present invention can be used for the undercoating layer or the color recording layer of the heat-sensitive paper to obtain a coated surface having excellent smoothness.

Moreover, the primary particles are coagulated little, the secondary particle diameter is from 1 to 5 μm as measured by the Coulter Counter method, and the amorphous silica disperses excellently into the resin. Moreover, the film that is formed develops no fisheyes or voids and exhibits excellent appearance.

When used for the heat-sensitive recording paper, furthermore, the amorphous silica of the present invention exhibits satisfactory effects for preventing adhesion of scum and for preventing sticking though the oil absorption amount is as small as 50 to 120 ml/100 g, and maintains favorable matching property with respect to the thermal head. This is due to the fact that the amorphous silica so far had to be highly oil absorption (100 ml/100 g or greater) but the heat-sensitive recording papers nowadays have a three-layer structure that includes the undercoated layer and need not be so highly oil-sucking. That is, when a pigment having oil-sucking property which is as great as 200 ml/100 g is used for the undercoating layer, the binder that is necessary for the color developing layer is absorbed too at the time of applying the heat-sensitive coating solution. The amorphous silica of the present invention which is modestly oil absorption does not absorb the binder excessively and helps increase the strength of the surface of the heat-sensitive recording papers. Moreover, when used for the undercoated layer or the color developing layer of not only the heat-sensitive paper of the two-layer structure but also of the heat-sensitive paper of the three-layer structure, the amorphous silica of the present invention exhibits the effect for preventing the adhesion of scum or for preventing sticking.

Moreover, the amorphous silica of the present invention has a very small porous diameter despite of its specific surface area which is as large as 200 to 500 m²/g as measured by the BET and makes it possible to obtain a heat-sensitive recording paper without ground fogging. For example, the white carbon or the gel-type silica having a large specific surface area develops ground fogging when the heat-sensitive coating solution is being prepared or when the heat-sensitive recording paper is prepared or after it is prepared because of the reason that the leuco-dye molecules enter into relatively large pores that work as a solid acid-type developer. The amorphous silica of the present invention, on the other hand, has a particular particle structure and a small oil absorption amount despite of its relatively large BET specific surface area. It is therefore considered that the amorphous silica of the present invention has a very fine porous diameter and does not absorb leuco-dye molecules.

It has further been empirically known that there exists such a relationship between the specific surface area and the surface hardness of the amorphous silica that the amorphous silica having a large specific surface area usually has Mohr's hardness of 2 or greater. According to this relationship, it is expected that the amorphous silica of the present invention has a large specific surface area, is dense, and has a large hardness, and causes the thermal head to be worn. As is obvious from FIG. 1, however, the amorphous silica used in the present invention is quite round in appearance and exists as groups of edgeless coagulations and does not cause the thermal head to be worn out. Moreover, the amorphous silica of the present invention has a high purity and does not cause the thermal head to be corroded.

In relation to the primary particle structure mentioned above, furthermore, the amorphous silica used in the present invention has an additional feature in that it has an oil absorption amount which is as small as 50 to 120 ml/100 g yet having a relatively large BET specific surface area. In blending the filler or the pigment into the resin, in general, the surface is wet well as the specific surface area becomes small, and the volume being charged becomes small and is easily blended as the apparent specific gravity becomes great. The amorphous silica of the present invention has a large apparent specific gravity and a small oil absorption amount, and can be highly densely applied as a heat-sensitive recording layer composition, make it possible to prepare a coating solution that can be favorably applied even with a small amount of binder, and can further be blended into the resin and uniformly dispersed into the resin.

The important feature of the amorphous silica used in the present invention is that the apparent specific gravity (JIS K 6220.6.8 method) lies within a range of from 0.24 to 0.55 g/cm$^3$. The amorphous silica having a large apparent specific gravity has a coarse primary particle diameter (amorphous silica of the sedimentation method). On the other hand, the amorphous silica having fine primary particle diameter has an apparent specific gravity which is smaller than 0.2 g/cm$^3$. However, the amorphous silica of the present invention is more dense than the conventional amorphous silica of the sedimentation method, and has an apparent specific gravity which is nearly comparable to that of the amorphous silica of the gel method. The amorphous silica used in the present invention is dense and is prevented from becoming powdery, exhibits excellent handling property, can be easily blended and kneaded with the resin, and can be processed well. Moreover, the powdery particles are dense and does not easily fly into the air, and does not deteriorate the working environment.

DETAILED DESCRIPTION OF THE PREFERRED EMBODIMENTS

Amorphous Silica

Figure 1:
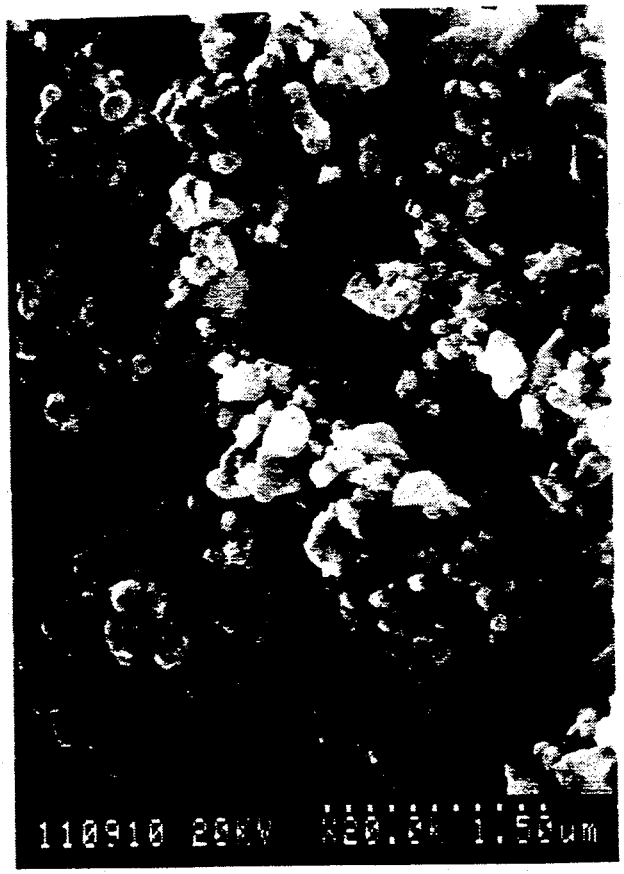
FIG. 1 is a scanning-type electron microphotography (magnification of 20,000 times) showing the particle structure of an amorphous silica filler of the present invention.

According to the present invention, the amorphous silica has an average primary particle diameter (measured by using a scanning-type electron microscope) of 100 to 270 nm, has an average secondary particle diameter as measured by the Coulter Counter method of from 1 to 5 μm, preferably from 1.5 to 4.5 μm, and particularly preferably from 1.8 to 3 μm, has an apparent specific gravity (JIS K 6220.6.8 method) of from 0.24 to 0.55 g/cm$^3$, preferably from 0.27 to 0.5 g/cm$^3$, and particularly preferably from 0.3 to 0.45 g/cm$^3$, has an oil absorption amount (JIS K 5105 method) of from 50 to 120 ml/100 g, preferably smaller than 100 ml/100 g and particularly preferably smaller than 80 ml/100 g, has a BET specific surface area (SA) of from 200 to 500 m$^2$/g, and an agglomeration degree (DA) defined by the ratio of (average primary particle diameter (D1))÷(silica elementary particle diameter (D0)) of from 10 to 50, preferably from 15 to 45, and particularly preferably from 20 to 40.

Preparation Method

Though not limited to the below-mentioned method, the amorphous silica used in the present invention is prepared by a method which can be located midway between the conventional gelation method and the sedimentation method and, more concretely, by reacting an acid sol in the presence of sodium silicate and an aqueous solution of salts under particular conditions. In preparing the amorphous silica of the present invention, first, it is desired to prepare an acid silica sol in which the equivalent amount of silica component put to the reaction has a pH of 0.2 to 2.5 and the concentration of silica reckoned as $SiO_2$ is from 3 to 20% by weight.

The acid silica sol is obtained by adding an aqueous solution of sodium silicate of an amount of 20 to 70% of the total weight of sodium silicate to an aqueous solution of hydrochloric acid or sulfuric acid of 10 to 60% by weight with stirring, such that the pH value after the reaction lies within the below mentioned range. Then, the acid silica sol is added to the remaining aqueous solution of sodium silicate in which table salt is dissolved so that the amount of silica reckoned as $SiO_2$ is 10 to 100% by weight with stirring at 5° to 90° C., in order to obtain a silica hydrogel of the present invention.

Here, it is important that the solution is sufficiently stirred so that the pH value will be from 5 to 8, and preferably from 6 to 7 after the reaction.

Furthermore, the reaction method for preparing the silica hydrogel of the present invention is in no way limited to the above-mentioned method only, but may be the one in which the acid silica sol is prepared, table salt is made present therein in an amount of 10 to 300% by weight of the amount of $SiO_2$, and the remaining aqueous solution of sodium silicate is added thereto, so that the pH value lies between 5 to 8 after the reaction.

Then, the silica hydrogel is filtered and washed with water by an ordinary method, dried at a temperature of 120° to 400° C., and is, as required, classified to obtain a product of the invention.

The amorphous silica obtained according to the present invention has an $SiO_2$ content to the weight, and preferably 91 to 95% by weight under the condition of being dried at 150° C.

The amorphous silica filler used in the present invention is prepared by the method described above. If the amorphous silica obtained by neutralizing or salting-out the acid silica sol is referred to as the sedimentation-method silica and if the amorphous silica obtained by neutralizing the sodium silicate is referred to as the gel-method silica, then the amorphous silica of the present invention can be said to be comprised of both the sedimentation-method silica and the gel-method silica.

Usually, the sedimentation-method silica and the gel-method silica are mixed together in the form of elementary particles. It will, however, be obvious for people skilled in the art that they may have a composite particulate structure in which either one or both of them have the form of nuclear particles, and the surfaces of the nuclear particles are covered with shells (coatings) of the sedimentation-method silica or the gel-method silica.

When the amorphous silica of the present invention is used as an anti-blocking agent for resins, other organic components may be carried or blended at the time of molding the resin, such as lubricating agent, antistatic agent, plasticizer, nucleating agent, defogging agent, ultraviolet-ray absorbing agent, anti-oxidizing agent, insecticidal agent, fungicidal agent, perfumes, coloring agent medicinal agent, and like components. Moreover, the amorphous silica can be used being blended with other inorganic fillers. Furthermore, the filler as well as the above organic components may have been surface-treated in advance with various metal soaps, waxes, resin, surfactant, lubricating agent, various coupling agents, or inorganic oxides.

The organic components and inorganic components that are carried or blended or are used for the surface-treatment, should be in amounts of 0.1 to 30% by weight and, particularly in amounts of 1 to 10% by weight with respect to the amorphous silica.

Applications

The order to impart transparency, slipping property and anti-blocking property, the amorphous silica of the present invention can be used for the resin molded products such as a variety of drawn films, e.g., used being blended in a variety of thermoplastic resins like a homopolymer of propylene which is a crystalline propylene copolymer or an ethylene-propylene copolymer; low-, medium- an high-density or linear low-density polyethylene; olefin-type resins such as ionically cross-linked olefin copolymer, ethylene-vinyl acetate copolymer, ethylene-acrylic acid ester copolymer, or the like; thermoplastic polyesters such as polyethylene terephthalate, polybutylene terephthalate, and the like; polyamide resins such as 6-nylon, 6,6-nylon, and 6,8-nylon; chlorine-containing resins such as vinyl chloride, vinylidene chloride, and the like; polycarbonates; and sulfones.

To accomplish the above object, the amorphous silica of the present invention can be blended in an amount of 0.01 to 10 parts by weight, and particularly in an amount of 0.1 to 5 parts by weight per 100 parts by weight of the thermoplastic resin.

By utilizing the above-mentioned properties, furthermore, the amorphous silica of the present invention can be contained as a filler for heat-sensitive recording paper in a heat-sensitive recording layer composition which is known per se in an amount of 5 to 60% by weight, and particularly in an amount of 20 to 40% by weight on the basis of solid component.

In this composition, examples of the leuco pigment which is a color agent includes triphenylmethane-type leuco pigment, fluoran-type leuco pigment, spiroran-type leuco pigment, fluoran-type leuco pigment, spiroran-type leuco pigment, Rhodamine lactam-type leuco pigment, Auramine-type leuco pigment, and phenoliazine-type leuco pigment, which can be used alone or in a combination of two or more for the heat-sensitive recording papers of this kind.

Any phenol can be used as a color coupler, such as bisphenol A, bisphenol F, or 2,6-dioxybenzoic acid, which is in a solid form at normal temperature and melts upon heating.

It is further allowable to use, as auxiliary components, calcium carbonate baked kaolin, aluminum hydroxide, and silicates such as aluminum silicate, calcium silicate and magnesium silicate which are widely known fillers, being mixed in the silica of the present invention.

As a binder, furthermore, there may be used any water-soluble resin or water-dispersing resin, such as starch, cyanomethyl starch, carboxyl starch, carboxymethyl cellulose, hydroxyethyl cellulose, polyvinyl alcohol, water-soluble acrylic resin, vinyl methyl-ether copolymer, sodium alginate, SBR latex, NBR latex, or ethylene-vinyl acetate copolymer.

As sensitizing agent, furthermore, there can be blended various waxes, such as fatty acid, fatty acid amide, carnauba wax, polyethylene wax, or organic bases such as alkanolamine for preventing the development of ground color.

To form the heat-sensitive recording layer, a dispersion solution of leuco pigment dispersed in a binder solution and a dispersion solution of phenols dispersed in a binder solution are prepared, and are applied onto a paper or a synthetic paper. The amorphous silica filler of the present invention can be mixed in advance in a dispersion solution of phenol and there further may be separately prepared a dispersion solution of the amorphous silica filler dispersed in a binder solution, which are then mixed into the above two dispersion solutions to form the heat-sensitive recording layer.

Moreover, the amorphous silica filler of the present invention can be blended in the heat-sensitive layer or can be used as the undercoated layer being applied onto the heat-sensitive layer. As will be obvious from the scanning-type electron microphotography of FIG. 1, the filler for heat-sensitive recording paper of the present invention has nearly spherical appearance with uniform particle diameters. When used as the undercoated layer, therefore, the ground is uniformalized contributing to greatly improving the smoothness of the recording layer that is a top layer.

Moreover, the amorphous silica of the present invention can be used for a variety of applications being blended in various paints, adhesives, and coating resin compositions, and can be blended as a filler in medicines, foods, agricultural chemicals and insecticides.

Being used in combination with calcium carbide, furthermore, the amorphous silica filler of the present invention can be applied as a top coated layer to serve as a delustering agent for tracing papers, a writability improving agent, a writability improving agent for synthetic papers, color improving agent for diazo photosensitive papers, and a sticking agent for inks.

EXAMPLES

The invention will now be concretely described by way of the following examples. Here, in the present invention, the amorphous silica was tested for its properties, and the anti-blocking agent and the filler for heat-sensitive paper were tested and evaluated in a manner as described below.

(1) BET specific surface area

The nitrogen gas-adsorption amount (cc/g) adsorbed by the surface of a sample as a single molecular layer if found by using an automatic BET specific surface area measuring instrument (manufactured by CARLO-EBRA Co., Sorptomatic Series 1800), and the BET specific surface area is calculated from a specific surface area $(SA) = 4.35 \times Vm$ (m$^2$/g).

(2) Average secondary particle diameter (median diameter)

A particle diameter found from a 50% point of volume distribution on a cumulative particle size curve obtained by the Coulter Counter method (manufactured by Coulter Electronics Co. of U.S.A., Model TA-II).

(3) Primary particle diameter

Particle diameters (nm) in a limited visual field image are arithmetically averaged to find an average primary particle diameter by using a scanning-type electron microscope WET-SEM (WS-250) manufactured by Akashi Beam Technology Co. of Japan.

(4) Elementary particle diameter.

It has been clarified by R. K. Iler* that there exists the following relationship between the BET specific area SA (m$^2$/g) and the elementary particle diameter D0 (nm), and D0 (nm) is calculated from the relationship $SA = 2727/D0$.

*Ralph K. Iler, The Colloid Chemistry of Silica and Silicates, Cornell University Press, 1955.

(5) Agglomer degree (DA)

The agglomeration degree DA of silica elementary particles constituting primary particles is defined by the formula, DA = (average primary particle diameter (D1)) ÷ (silica elementary particle diameter (D0))

(6) Oil absorption amount

The oil absorption amount is found on compliance with JIS K 5101-19 that specifies a pigment testing method.

(7) pH Value

The pH value is found in compliance with JIS K 5101-24A that specifies pigment testing method.

(8) Apparent specific gravity

The apparent specific gravity (g/cm$^3$) is found in compliance with JIS K 6220.6.8 that specifies method of testing blending agents for rubbers.

(9) Preparation of films.

Undrawn polypropylene film (C-PP film)

C-PP films are obtained under the following conditions by using two kinds of polymers, i.e., a homopolymer of a propylene (melt flow rate MFR = 1.8 g/10 min., isotactic index I.I. = 96.0) as a crystalline propylene-type polymer and an ethylene-propylene random copolymer (melt flow rate MFR = 6.5 g/10 min isotactic index I.I. = 97.0, ethylene content = 4.0 mol %, DSC melting point = 140° C. according to ASTM D-3417).

An amorphous silica powder is added as an anti-blocking agent (hereinafter referred to as AB agent) in an amount of 0.15 parts per 100 parts of the propylene-type polymer. At the same time, 0.15 parts of a 2,6-ditertiary butyl paracresol and 0.1 part of calcium stearate are added as anti-oxidizing agents, and the mixture re mixed using the Henschel mixer at 1000 rpm for 3 minutes. The mixture is then melted and pelletized using a monoaxial extruder having a diameter of 65 mm. The pellets are extruded by as extruder of 35 mm in diameter having a T-dies at 230° C. to obtain an undrawn film (film sample F-1) having a thickness of 25 μm.

Biaxially drawn polypropylene film (O-PP film)

An amorphous silica powder is added as an AB agent in an amount of 0.15 parts per 100 parts of a homopolymer of a propylene (melt flow rate MFR = 1.8 g/10 min., isotactic index I.I. = 96.0) which is a crystalline propylene-type polymer. At the same time, 0.15 parts of a 2,6-ditertiary butyl paracresol and 0.1 part of calcium stearate are added as anti-oxidizing agents, and the mixture is mixed using the Henschel mixer at 1000 rpm for 3 minutes. The mixture is then melted and pelletized using the monoaxial extruder having a diameter of 65 mm. The pellets are extruded by an extruder of 35 mm in diameter having T-dies at 230° C. to obtain a sheet-like film 1250 μm in thickness. Using biaxially drawing molding machine having a diameter of 115 mm, the film is drawn at 115° C. into five times in the vertical direction and is then drawn into ten times in the lateral direction is a tenter oven at 170° C., in order to obtain a biaxially drawn film having a thickness of 25 μm (film sample F-2).

Nylon film (O-NY film)

The amorphous silica powder is added as an AB agent in an amount of 5 parts per 94 parts of a 6-nylon powder (granular diameter of 300 mesh or smapper, specific gravity = 1.14, melting point = 220° C.). At the same time, 1 part of ethylenebis-stearylamide is added as a dispersing agent, and the mixture is mixed by the Henschel mixer at 1000 rpm for 3 minutes. The mixture is then melted at 260° C. by using a monoaxial extruder of a diameter of 65 mm to obtain master pellets containing 5 parts of the AB agent. 2 Parts of the master pellets and 98 parts of the 6-nylon pellets without containing AB agent are mixed together to obtain pellets containing 0.1 part of the AB agent. The mixture pellets are then melt-extruded by an extruder of a diameter of 35 mm having a T-dies, and are solidified on cooling roll of 40° C. to obtain an undrawn film having a thickness of 140 μm. The film is biaxially drawn simultaneously into three times in the vertical and lateral directions at a drawing temperature of 120° C. by using a biaxially drawing molder having a diameter of 115 mm, and is then thermally set at 190° C. to obtain a biaxially drawn film having a thickness of 15 ‖ m (film sample F-3).

(10) Appearance of films

Fisheyes or voids appearing on the surfaces of films of a size of 20 cm × 20 cm are observed by naked eyes, and are evaluated on the following basis.

⊚: No fisheye or void is observed.
○: Fisheyes or voids are recognized on the areas less than about 10 % of the whole film.
△: Fisheyes or voids are spreading on about 50% of the whole film.
X: There are fisheyes or voids in such large amounts as more than about 50% of the whole film.

(11) Scratch resistance on the film surfaces

Rolled films (200 m/roll) after the preparation are unwound three times at a speed of about 20 m/min. and are evaluated on the following basis.

○: The degree of scratch is very small or there is no scratch.

Δ: Scratch is apparently recognized but is not spreading on the whole surface.

X: There are so many scratches that the film is not practically usable.

(12) Haze (%) of films

The haze is measured in compliance with the method of ASTM-D 1003-61 by using a directly read-type haze meter manufactured by Suga Testing Machine Co., Japan.

(13) Static coefficient of friction

The static coefficient of friction ($\mu s$) and the dynamic coefficient of friction ($\mu d$) are measured in compliance with the method of ASTM-D 1894 by using a slop tester manufactured by Nippon Rigaku Kogyo Co., Japan under the following conditions.

Film sample F-1: 23° C., 40° C.×3 days
Film sample F-2: 40° C.×1 day
Film sample F-3: RH (relative humidity) 65%, RH 85%

(14) Anti-blocking property (AB property: g/cm)

Two pieces of films are superposed one upon the so that the contact area is 10 cm², sandwiched between two pieces of glass plates, and are left to stand at 40° C. for 24 hours under the application of a load of 50 g/cm². After left to stand, a maximum load with which the upper film and the lower film peel off from each other is measured using a frictional coefficient measuring instrument manufactured by Toyo Seiki Co., Japan.

Film sample F-1: 50° C.×7 days
Film sample F-2: 50° C.×30 days

(15) Evaluation of heat-sensitive recording paper (preparation of recording paper)

1 Part of amorphous silica having properties shown in Table 1 is dispersed as a filler in 4 parts of water using a disper at 2000 rpm for 5 minutes. To the mixture are added 3 parts of a solution A, 6 parts of a solution B, 6 parts of a solution C, and 3 parts of a solution D that are described below, followed by sufficient mixing to prepare a coating solution for the heat-sensitive papers. In the solutions A, B, C and D, the Paint Conditioner Model 5410 (Red Devil Inc.) is pulverized by using magnetic balls as a pulverizing medium, so that the average particle size of fine particles in the solution is smaller than 3 μm as measured by the Couter Counter method.

| Solution A: | 3-dibutylamino-6-7-anilinofluoran | 1 part |
| | 5% polyvinyl alcohol | 5 parts |
| Solution B: | bisphenol A | 1 part |
| | 5% polyvinyl alcohol | 5 parts |
| Solution C: | stearic acid amide | 1 part |
| | 5% polyvinyl alcohol | 5 parts |
| Solution D: | zinc stearate | 1 part |
| | 5% polyvinyl alcohol | 5 parts |

A paper (paper for PPC) of 45 g/m² is coated with a coating solution for heat-sensitive recording paper prepared under the above-mentioned conditions in a coating amount of about 6 g/m² (dry basis) using a coating rod, followed by drying and calendering to obtain a paper for heat-sensitive recording. The thus obtained heat-sensitive recording paper is evaluated with regard to its ground fouling, dynamic coloring property, and effect for preventing the adhesion of scum.

In order to separately demonstrate the properties of the filler, furthermore the aqueous dispersion system of the amorphous silica is evaluated for its viscous properties.

Evaluation of the heat-sensitive recording paper

(1) Ground fouling

The obtained heat-sensitive recording paper is left to stand in a room for 72 hours, and the concentration of ground fouling that spontaneously appears on the coated surface is measured by using Fuji Standard Densitometer FSD-103 (manufactured by Fuji Photofilm Co., Japan). At the same time, the ground fouling is evaluated on the following basis.

○: The concentration of ground fouling is smaller than 0.13, and almost no fouling is recognized.

Δ: The concentration of ground filing is greater than 0.13 but is smaller than 0.20, and fouling is recognized to a slight degree.

X: The concentration of ground fouling is greater than 0.20, and fouling is so conspicuous that the recording paper is not utilizable.

(2) Dynamic coloring property

By using the heat-sensitive printing apparatus TH-PMD (manufactured by Okura Denki Co., Japan), the thus obtained heat-sensitive recording paper is subjected to the recording under the conditions of printing voltage of 24 V, pulse period of 2 msec, a printing pulse width of 0.5 to 1.5 msec, and a thermal head resistance of 51 Ω, and the coloring sensitivity is evaluated on the following evaluation basis, and the accomplished concentration (pulse width, 1.5 msec) is measured by using the Fuji Standard Densitometer FSD-103.

○: A dynamic coloring sensitivity curve of coloring concentration with a pulse width (0.5 to 1.5 msec) rises steeply, and the accomplished concentration is as high as 1.37 or more.

Δ: A dynamic coloring sensitivity curve of coloring concentration with a pulse width (0.5 to 1.5 msec) rises relatively steeply, and the accomplished concentration is greater than 1.30 but is smaller than 1.37 and is relatively low.

X: A dynamic coloring sensitivity curve of coloring concentration with a pulse width (0.5 to 1.5 msec) rises mildly, and the accomplished concentration is as low as 1.30 or smaller.

(3) Effect for preventing the adhesion of scum

The obtained heat-sensitive recording paper is printed solidly black by using an NTT FAX-510T, and the scum adhered to the thermal head after the printing is observed by naked eyes. Furthermore, a test pattern paper is prepared on which solid black squares of 1 cm×1 cm are arranged up and down and right and left maintaining a distance of 3 mm, and is printed on the heat-sensitive recording paper to observe by naked eyes small black dots of scum (dispersion of scum) appearing on the white ground (nonprinted portions) along a direction in which the recording paper moves. The effect for preventing the adhesion of scum is evaluated on the following evaluation basis.

○: Adhesion of scum on the thermal head is not at all recognized, and dispersion of scum is not recognized on the printed surface.

Δ: Adhesion of scum on the thermal head is recognized to a slight degree, and dispersion of scum is recognized to a slight degree on the printed surface.

X: Adhesion of scum on the thermal head is obviously recognized, and dispersion of scum is obviously recognized on the printed surface.

Figure 4:
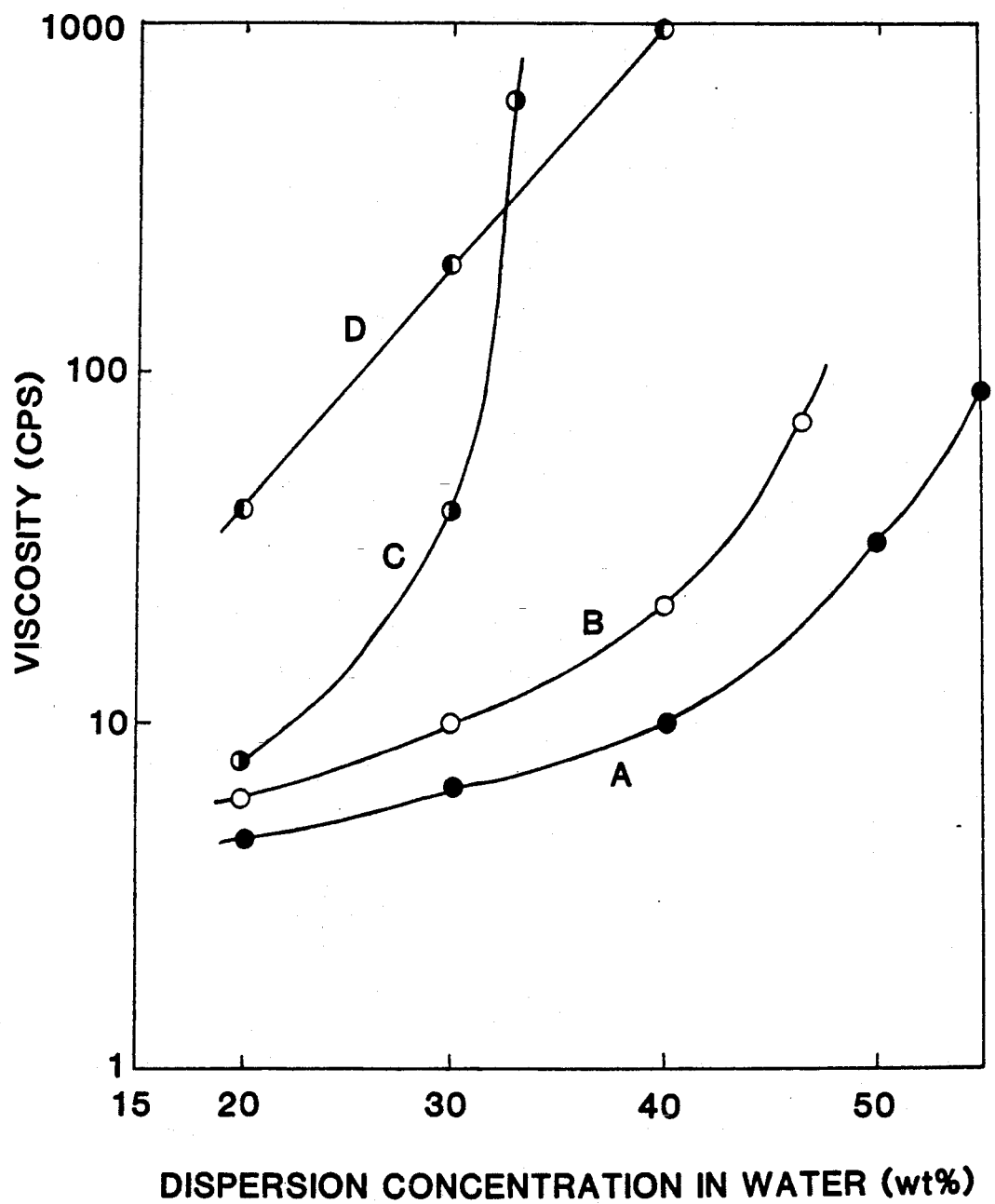
FIG. 4 is a diagram illustrating a relationship between the dispersion concentration of a filler in water and the viscosity wherein a curve A is that of when the amorphous silica (Example 1) of the present invention is used, a curve B is that of when a baked kaolin is used, a curve C is that of when the conventional amorphous silica (Comparative Example 2) is used, and a curve D is that of when a light calcium carbonate is used.

In order to demonstrate the properties of amorphous silica as a filler, the viscosity of an aqueous dispersion is measured under the following conditions, and the results are shown in FIG. 4.

By using a high-speed disper, the amorphous silica is dispersed in the city water in one-liter beakers at 2000 rpm, for 5 minutes at room temperature, such that the amorphous silica concentrations are 20% by weight, 30% by weight and 50% by weight. Viscosities of the dispersion slurries are measured at 20° C. by using a B-type viscometer (manufactured by Tokyo Keiki Seizosho Co.).

EXAMPLE 1

In preparing amorphous silica using a sodium silicate solution (specific gravity 1.29, composition $3.3SiO_2\cdot Na_2O\cdot nH_2O$) and a sulfuric acid solution of a concentration of 13%, an acid silica sol was first prepared using half the amount of the sodium silicate solution by a method mentioned below.

The sodium silicate solution of an amount corresponding to 50% of the whole reaction amount was poured into the sulfuric acid solution with stirring at a temperature maintained lower than 20° C. over a period of 2 hours to obtain an acid silica sol having a pH of 0.7. Then, NaCl was added to the remaining 50% of the sodium silicate solution so that the weight ratio of $SiO_2$ NaCl was 1:1, and the acid silica sol solution obtained above was added thereto with stirring over a period of 5 hours. The obtained silica slurry that possessed pH of 6.5 was filtered and washed, and a silica cake was dried at 110° to 350° C., pulverized and classified to obtain amorphous silica having average secondary particle diameters of 1.8 μm, 2.7 μm and 3.5 μm (samples 1, 2 and 3). The obtained morphous silica particles exhibited properties as shown in Table 1, the samples F-1 of resin films using the amorphous silica particles as AB agents were evaluated as shown in Tables 2 and 3, the samples F-2 were evaluated as shown in Table 4, and the samples F-3 were evaluated as shown in Table 5.

The obtained amorphous silica was 93.5% by weight reckoned as $SiO_2$ under the condition of being dried at 150° C.

EXAMPLE 2

An acid silica sol was prepared in the same manner as in Example 1 using hydrochloric acid as mineral acid, and amorphous silica was obtained in a manner as described below by using the above sol.

The sodium silicate solution of an amount corresponding to 33% of the whole reaction amount was poured into the hydrochloric acid solution (concentration 14%, specific gravity 1.07) with stirring at a temperature maintained lower than 20° C. over a period of 1.5 hours to obtain an acid silica sol having pH of 0.3. Then, NaCl was added to the remaining 67% of the sodium silicate solution so that the weight ratio of $SiO_2$:NaCl was 1: 0.15,and the mixture was heated at 60° C. To the mixture was poured the acid silica sol solution that was obtained above with stirring over a period of 4 hours. The obtained silica slurry possessed pH of 7.2, from which amorphous silica having an average secondary particle diameter of 2.18 μm was obtained in the same manner as in Example 1 (sample 4). The thus obtained amorphous silica exhibited properties as shown in Table 1, the sample F-1 of resin film using the amorphous silica as an AB agent was evaluated as shown in Tables 2 and 3, the sample F-2 was evaluated as shown in Table 4, and the sample F-3 was evaluated as shown in Table 5.

The obtained amorphous silica was 91.4% by weight reckoned as $SiO_2$ under the condition of being dried at 150° C.

EXAMPLE 3

An acid silica sol was prepared in the same manner as in Example 1 using hydrochloric acid as mineral acid, and amorphous silica was obtained in a manner as described below by using the above sol.

The sodium silicate solution of an amount corresponding to 67% of the whole reaction amount was poured into the hydrochloric acid solution (concentration 14%, specific gravity 1.07) with stirring at a temperature lower than 20° C. over a period of 2.5 hours to obtain an acid silica sol having a pH of 1.4. Then, NaCl was added to the remaining 33% of the sodium silicate solution so that the weight ratio of $SiO_2$:NaCl was 1:2.5, and the acid silica sol solution obtained above was added thereto with stirring over a period of 5 hours. The obtained silica slurry possessed a pH of 7.1, from which amorphous silica having an average secondary particle diameter of 2.8 μm was obtained in the same manner as in Example 1 (sample 5). The thus obtained amorphous silica exhibited properties as shown in Table 1, the sample F-1 of resin film using the amorphous silica as an AB agent was evaluated as shown in Tables 2 and 3, the sample F-2 was evaluated as shown in Table 4, and the sample F-3 was evaluated as shown in Table 5.

The obtained amorphous silica was 94.6% by weight reckoned as $SiO_2$ under the condition of being heated at 150° C.

EXAMPLE 4

In preparing amorphous silica, a concentrated acid silica sol solution was continuously obtained by a method described below, and then, a sodium silicate solution containing NaCl and an acid silica sol solution were continuously contacted and reacted together under a heated condition to obtain amorphous silica.

An acid silica sol was prepared by a method described below using the same sodium silicate solution as that of Example 1 and a sulfuric acid solution (concentration 40%, specific gravity 1.25). The sodium silicate solution of an amount corresponding to 50% of the whole reaction amount and the sulfuric acid solution were continuously supplied at a temperature of lower than 25° C. using an apparatus capable of supplying them at a volume ratio of 4:1, and were quickly shear-stirred in order to continuously obtain an acid silica sol (pH 2.1). To the remaining 50% of the sodium silicate solution was added NaCl in such as amount that the weight ratio of $SiO_2$:NaCl was 1:2. The resulting sodium silicate solution and the acid silica sol solution obtained by the above method were continuously supplied and were reacted together at 60° C. with rapid shear-stirring to obtain amorphous silica, from which amorphous silica having an average secondary particle diameter of 2.2 μm (sample 6) and amorphous silica having an average secondary particle diameter of 4.1

μm (sample 7) were obtained in the same manner as in Example 1. The thus obtained amorphous silica particles exhibited properties as shown in Table 1. The thus obtained amorphous silica particles exhibited properties as shown in Table 1, the samples F-1 of resin films using the amorphous silica particles as AG agents were as evaluated in Tables 2 and 3, the samples F-4 were as evaluated in Table 4, and the samples F-3 were as evaluated in Table 5.

The obtained amorphous silica was 92.8% by weight reckoned as $SiO_2$ under the condition of being heated at 150° C.

COMPARATIVE EXAMPLE 1

The film was tested and evaluated in the same manner as in the above Examples by using a sample H1 of amorphous silica which was a commercially available product A (produced by Mizusawa Kagaku Kogyo Co., Japan) having an average secondary particle diameter of 1.7 μm.

COMPARATIVE EXAMPLE 2

The film was tested and evaluated in the same manner as in the above Examples by using a sample H2 of amorphous silica which was a commercially available product B (produced by Fuji Debison Co., Japan) having an average secondary particle diameter of 2.1 μm.

COMPARATIVE EXAMPLE 3

The film was tested and evaluated in the same manner as in the above Examples by using a sample H3 of amorphous silica which was a commercially available product B (produced by Fuji Debison Co.) having an average secondary particle diameter of 3.1 μm.

Like in the above Examples, the amorphous silica particles obtained in the Comparative Examples 1, 2 and 3 exhibited properties as shown in Table 1, the samples F-1 of resin films using the amorphous silica particles as AB agents were evaluated as shown in Tables 2 and 3, the samples F-2 were evaluated as shown in Table 4, and the samples F-3 were evaluated as shown in Table 5.

EXAMPLES 5 AND 6

The amorphous silica particles of samples Nos. 1 and 6 obtained in Examples 1 and 4 were used as fillers for heat-sensitive recording papers, in order to prepare heat-sensitive recording papers by the aforementioned recording paper preparation method. The ground fouling, dynamic coloring property, and effect for preventing the adhesion of scum were evaluated. The results were as shown in Table 6.

COMPARATIVE EXAMPLES 4 TO 6

The amorphous silica particles of samples Nos. H1 to H3 used in Comparative Examples 1 to 3 were used as fillers for heat-sensitive recording papers, in order to prepare recording papers in the same manner as in Example 5. The results were as shown in Table 6.

TABLE 1

| | Properties of amorphous silica particles | | | | | | | | | |
|---|---|---|---|---|---|---|---|---|---|---|
| | Example | | | | | | | Comparative Example | | |
| | 1 | 1 | 1 | 2 | 3 | 4 | 4 | 1 | 2 | 3 |
| Sample No. | 1 | 2 | 3 | 4 | 5 | 6 | 7 | H1 | H2 | H3 |
| pH | 7.14 | 7.15 | 7.14 | 7.50 | 7.8 | 6.7 | 6.72 | 6.98 | 7.96 | 3.90 |
| Oil-sucking amount (ml/100 g) | 86 | 83 | 76 | 92 | 98 | 70 | 63 | 162 | 263 | 106 |
| Specific surface area ($m^2/g$) | 370 | 376 | 386 | 315 | 280 | 465 | 465 | 55 | 288 | 704 |
| Apparent specific gravity ($g/cm^3$) | 0.321 | 0.342 | 0.376 | 0.286 | 0.272 | 0.43 | 0.523 | 0.188 | 0.138 | 0.506 |
| Average secondary particle diameter (μm) | 1.8 | 2.7 | 3.5 | 2.1 | 2.8 | 2.2 | 4.1 | 1.7 | 2.1 | 3.1 |
| Average primary particle diameter: D1 (nm) | 180 | 180 | 180 | 150 | 200 | 250 | 250 | 80 | 9.8* | ∞ |
| Elementary particle diameter: D0 (nm) | 7.4 | 7.3 | 7.1 | 8.7 | 9.7 | 5.9 | 5.9 | 49.6 | 9.4 | 3.8 |
| Agglomeration degree: (D1/D0 = DA) | 24.4 | 24.8 | 25.5 | 17.3 | 20.5 | 42.7 | 42.7 | 1.61 | 1.04 | ∞ |

Figure 2:
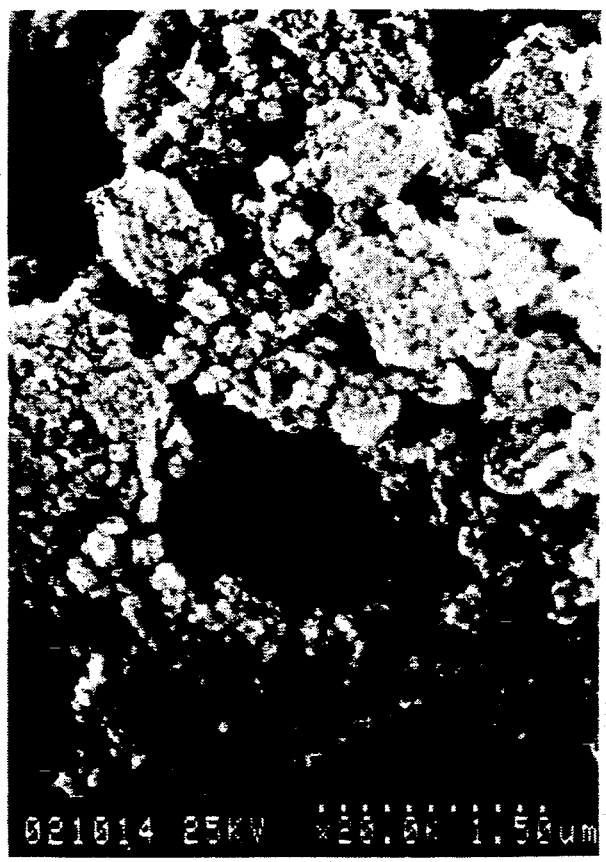
FIG. 2 is a scanning-type electron microphotography (magnification of 20,000 times) showing the particle structure of a conventional amorphous silica (Comparative Example 2)
Figure 3:
FIG. 3 is a scanning-type electron microphotography (magnification of 20,000 times) showing the particle structure of a conventional amorphous silica (Comparative Example 3)

*Average diameter of particles from which coarse particles as seen in FIG. 2 have been removed.

TABLE 2

| | Evaluation of film samples F-1 | | | | | | | | | |
|---|---|---|---|---|---|---|---|---|---|---|
| | Example | | | | | | | Comparative Example | | |
| | 1 | 1 | 1 | 2 | 3 | 4 | 4 | 1 | 2 | 3 |
| Sample No. | 1 | 2 | 3 | 4 | 5 | 6 | 7 | H1 | H2 | H3 |
| Haze (%) | 2.5 | 2.6 | 2.8 | 2.5 | 2.7 | 2.5 | 3.2 | 2.5 | 2.7 | 2.9 |
| Gloss (%) | 97 | 95 | 95 | 96 | 95 | 96 | 93 | 97 | 95 | 93 |
| Slipping property* | | | | | | | | | | |
| static/ | 0.65/ | 0.68/ | 0.70/ | 0.65/ | 0.70/ | 0.63/ | 0.72/ | 0.60/ | 0.65/ | 0.68/ |
| dynamic | 0.51 | 0.53 | 0.55 | 0.50 | 0.56 | 0.50 | 0.58 | 0.50 | 0.50 | 0.55 |
| Slipping property*2 | | | | | | | | | | |
| static/ | 0.31/ | 0.33/ | 0.34/ | 0.29/ | 0.34/ | 0.28/ | 0.36/ | 0.27/ | 0.30/ | 0.33/ |
| dynamic | 0.27 | 0.29 | 0.30 | 0.26 | 0.30 | 0.25 | 0.32 | 0.24 | 0.26 | 0.29 |
| Anti-blocking property (g/cm)*3 | good | good | good | good | good | good | good | 0.25 | good | good |

TABLE 2-continued

Evaluation of film samples F-1

| Sample No. | Example 1-1 | Example 1-2 | Example 1-3 | Example 2-4 | Example 3-5 | Example 4-6 | Example 4-7 | Comparative Example 1 H1 | Comparative Example 2 H2 | Comparative Example 3 H3 |
|---|---|---|---|---|---|---|---|---|---|---|
| Scratch-resistant property | ○ | ○ | Δ | ○ | ○ | ○ | ○ | ○ | Δ | X |
| Appearance of film | ⊙ | ⊙ | ○ | ⊙ | ⊙ | ⊙ | ○ | X | X | ⊙ |

[1] 23° C. × 1 day,
[2] 40° C. × 3 days,
[3] 50° C. × 7 days

TABLE 3

Evaluation of film samples F-1

| Sample No. | Example 1-1 | Example 1-2 | Example 1-3 | Example 2-4 | Example 3-5 | Example 4-6 | Example 4-7 | Comp. Ex. 1 H1 | Comp. Ex. 2 H2 | Comp. Ex. 3 H3 |
|---|---|---|---|---|---|---|---|---|---|---|
| Haze (%) | 2.0 | 2.6 | 3.2 | 2.0 | 2.8 | 2.0 | 3.6 | 2.1 | 2.9 | 2.6 |
| Gloss (%) | 110 | 100 | 96 | 110 | 100 | 110 | 97 | 120 | 100 | 96 |
| Slipping property[1] static/dynamic | 0.30/0.26 | 0.35/0.32 | 0.45/0.37 | 0.32/0.27 | 0.39/0.31 | 0.32/0.27 | 0.48/0.37 | 0.27/0.24 | 0.41/0.32 | 0.37/0.32 |
| Slipping property[2] static/dynamic | 0.13/0.12 | 0.20/0.18 | 0.27/0.25 | 0.12/0.11 | 0.22/0.20 | 0.15/0.14 | 0.27/0.25 | 0.12/0.11 | 0.12/0.11 | 0.24/0.23 |
| Anti-blocking property (g/cm)[3] | 1.25 | 1.00 | 0.36 | 1.26 | 0.95 | 1.15 | 0.32 | 2.95 | 1.26 | 1.29 |
| Scratch-resistant property | ○ | ○ | Δ | ○ | ○ | ○ | Δ | ○ | Δ | X |
| Appearance of film | ⊙ | ⊙ | ○ | ⊙ | ○ | ⊙ | ○ | X | X | ⊙ |

[1] 23° C. × 1 day,
[2] 40° C. × 3 days,
[3] 50° C. × 7 days

TABLE 4

Evaluation of film samples F-2

| Sample No. | Example 1-1 | Example 1-2 | Example 1-3 | Example 2-4 | Example 3-5 | Example 4-6 | Example 4-7 | Comp. Ex. 1 H1 | Comp. Ex. 2 H2 | Comp. Ex. 3 H3 |
|---|---|---|---|---|---|---|---|---|---|---|
| Haze (%) | 1.0 | 1.1 | 1.3 | 1.0 | 1.3 | 1.0 | 1.4 | 1.1 | 1.3 | 1.4 |
| Gloss (%) | 143 | 139 | 135 | 140 | 139 | 140 | 133 | 143 | 135 | 133 |
| Slipping property[1] static/dynamic | 0.52/0.52 | 0.51/0.50 | 0.48/0.47 | 0.52/0.52 | 0.51/0.50 | 0.52/0.51 | 0.45/0.43 | 0.58/0.55 | 0.51/0.50 | 0.51/0.49 |
| Anti-blocking property (g/cm)[2] | good | good | good | good | good | good | good | 0.13 | 0.05 | good |
| Scratch-resistant property | ○ | ○ | Δ | ○ | ○ | ○ | Δ | ○ | Δ | X |
| Appearance of film | ⊙ | ⊙ | ○ | ⊙ | ○ | ⊙ | ○ | ⊙ | X | X |

[1] 40° C. × 1 day,
[2] 50° C. × 30 days

TABLE 5

Evaluation of film samples F-3

| Sample No. | Example 1-1 | Example 1-2 | Example 1-3 | Example 2-4 | Example 3-5 | Example 4-6 | Example 4-7 | Comp. Ex. 1 H1 | Comp. Ex. 2 H2 | Comp. Ex. 3 H3 |
|---|---|---|---|---|---|---|---|---|---|---|
| Haze (%) | 1.6 | 2.1 | 2.8/ | 1.7 | 2.2 | 1.7 | 2.8 | 5.0 | 2.4 | 2.2 |
| Gloss (%) | 143 | 139 | 135 | 140 | 139 | 145 | 135 | 152 | 140 | 135 |
| Slipping property[1] static/dynamic | 0.36/0.35 | 0.42/0.40 | 0.50/0.45 | 0.35/0.35 | 0.51/0.47 | 0.36/0.35 | 0.53/0.44 | 0.51/0.40 | 0.39/0.37 | 0.43/0.40 |
| Slipping property[2] static/dynamic | 0.46/0.43 | 0.51/0.47 | 0.57/0.47 | 0.45/0.42 | 0.58/0.50 | 0.50/0.48 | 0.55/0.47 | 0.57/0.47 | 0.60/0.55 | 0.68/0.62 |
| Scratch-resistant property | ○ | ○ | Δ | ○ | ○ | ○ | Δ | ○ | Δ | X |
| Appearance of film | ⊙ | ⊙ | ○ | ⊙ | ○ | ⊙ | ○ | ○ | X | X |

[1] 24° C. × R.H. 65%,
[2] 25° C. × R.H. 85%

TABLE 6

| | Example | | Comparative Example | | |
|---|---|---|---|---|---|
| Sample No. | 5 / 1 | 6 / 6 | 4 / H1 | 5 / H2 | 6 / H3 |
| Properties of amorphous silica particles | | | | | |
| pH | 7.14 | 6.70 | 6.98 | 7.96 | 3.90 |
| Dispersion property ($\mu$m) | 10 or less | 10 or less | 15–20 | 12–16 | 9–12 |
| Average particle diameter ($\mu$m) | 1.8 | 2.2 | 1.7 | 2.1 | 3.1 |
| Average primary particle diameter D1 (nm) | 180 | 250 | 80 | 9.8* | $\infty$ |
| Oil-sucking amount (ml/100 g) | 86 | 70 | 162 | 263 | 106 |
| Specific surface area (m$^2$/g) | 370 | 465 | 55 | 288 | 704 |
| Apparent specific gravity (g/cm$^3$) | 0.321 | 0.430 | 0.188 | 0.139 | 0.506 |
| Calculated primary particle diameter D0 (nm) | 7.37 | 5.86 | 49.58 | 9.46 | 3.8 |
| Agglomeration degree (D1/D0) | 24.4 | 42.66 | 1.61 | 1.03 | $\infty$ |
| Evaluation of heat-sensitive recording papers | | | | | |
| Ground fouling | | | | | |
| Evaluation | ◯ | ◯ | ◯ | X | X |
| Concentration | 0.12 | 0.12 | 0.11 | 0.32 | 0.36 |
| Dynamic coloring property | | | | | |
| Evaluation of coloring sensitivity | ◯ | ◯ | ◯ | ◯ | ◯ |
| Accomplished concentration | 1.40 | 1.38 | 1.40 | 1.41 | 1.41 |
| Effect for preventing adhesion of scum | ◯ | ◯ | ◯ | ◯ | ◯ |
| Viscosity | | | | | |
| viscosity of 20 wt % aqueous dispersion slurry (CPS) | 5 | 5 | 10 | 260 | not dispersed |
| viscosity of 30 wt % aqueous dispersion slurry (CPS) | 7 | 6 | 113 | not dispersed | not dispersed |
| viscosity of 50 wt % aqueous dispersion slurry (CPS) | 35 | 30 | not dispersed | not dispersed | not dispersed |

*Value of only those particles whose diameters could be measured.

We claim:

1. A silica filler comprising amorphous silica particles which have an average primary particle diameter (D1) of from 100 to 270 nm, an apparent specific gravity of from 0.24 to 0.55 g/cm$^3$, a specific surface area of from 200 to 500 m$^2$/g, a silica elementary particle diameter (D0) of from 5 to 15 nm, and an agglomeration degree (DA) defined by the ratio of D1/D0 of from 10 to 50.

2. A silica filler according to claim 1, wherein the amorphous silica particles have a median diameter of 1 to 5 $\mu$m.

3. A silica filler according to claim 1, wherein the amorphous silica particles exhibit an oil absorption capacity of 50 to 120 ml/g.

4. A silica filler accordeing to claim 1, wherein the amorphous silica particles have a median diameter of 1 to 5 $\mu$m, and exhibit an oil absorption capacity of 50 to 120 ml/g.

5. A silica filler according to claim 1, which comprises an aqueous dispersion slurry of said amorphous silica particles, wherein said aqueous dispersion has a viscosity of less than 100 cps.

6. A silica filler according to claim 1, which comprises an aqueous dispersion slurry of said amorphous silica particles containing 20 to 50% by weight of said amorphous silica particles, wherein said aqueous dispersion has a viscosity of 1 to 100 cps.

7. A silica filler according to claim 1, which comprises an aqueous dispersion slurry of said amorphous silica particles containing 20 to 50% by weight of said amorphous silica particles, wherein said aqueous dispersion has a viscosity of 5 to 100 cps.

8. A filler for heat-sensitive recording paper which comprises a heat-sensitive recording paper additive and the amorphous silica particles of claim 1.

9. A filler for heat-sensitive recording paper according to claim 8, wherein the amorphous silica particles have a median diameter of 1 to 5 $\mu$m and exhibit an oil absorption capacity of 50 to 120 ml/g.

10. A silica filler for heat sensitive recording paper according to claim 8 which comprises an aqueous dispersion slurry of said amorphous silica particles, wherein said aqueous dispersion has a viscosity of less than 100 cps.

11. A silica filler for heat sensitive recording paper according to claim 8 which comprises an aqueous dispersion of said amorphous silica particles containing 20 to 50% by weight of said amorphous silica particles, wherein said aqueous dispersion has a viscosity of 5 to 100 cps.

12. A silica filler comprising amorphous silica particles which have an average primary particle diameter (DI) of from 100 to 270 nm, an apparent specific gravity of from 0.24 to 0.55 g/cm$^3$, a specific surface area of from 200 to 500 m$^2$/g, a silica elementary particle diameter (D0) of from 5 to 15 nm, an agglomeration degree (DA) defined by the ratio of DI/D0 of 10 to 50, wherein the amorphous silica particles exhibit an oil absorption capacity of 50 to 120 ml/g and an aqueous slurry of said amorphous silica particles containing 20 to 50% by weight of said amorphous silica particles has a viscosity of less than 100 cps.

13. A silica filler according to claim 12 wherein said aqueous dispersion has a viscosity of 5 to 100 cps.

* * * * *